2,609,925

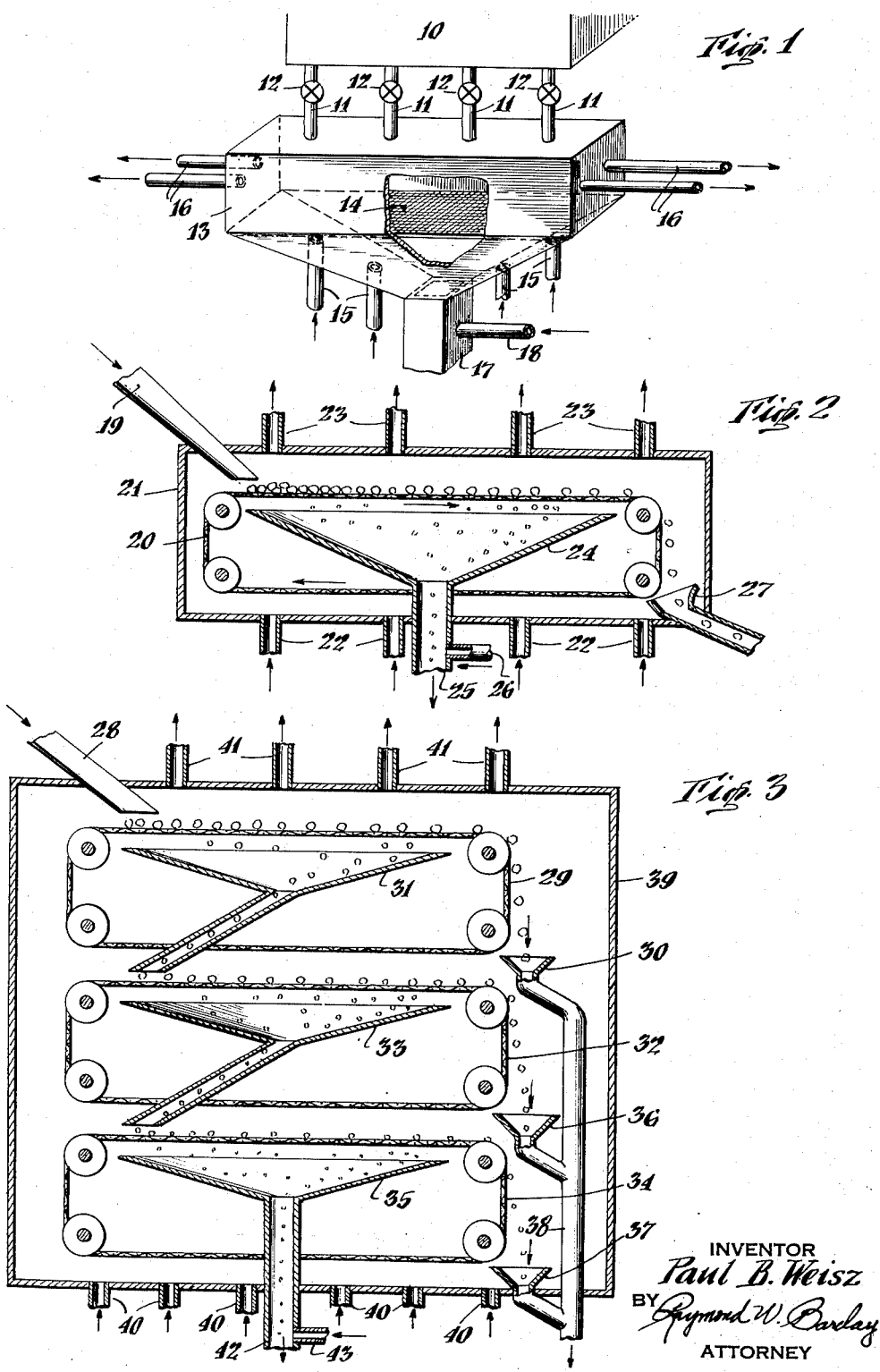
Sept. 9, 1952 — P. B. WEISZ — 2,609,925
PROCESS FOR SEPARATION OF PARTLY DRIED GEL PARTICLES
Filed April 9, 1951
INVENTOR
Paul B. Weisz
BY Raymond W. Barclay
ATTORNEY Patented Sept. 9, 1952

UNITED STATES PATENT OFFICE 2,609,925

PROCESS FOR SEPARATION OF PARTLY DRIED GEL PARTICLES

Paul B. Weisz, Pitman, N. J., assignor to Socony-Vacuum Oil Company, Incorporated, a corporation of New York Application April 9, 1951, Serial No. 220,040

7 Claims. (Cl. 209—2)

This invention relates to an improvement in the manufacture of inorganic oxide gel spheroids and more particularly is concerned with a method for effecting selective separation of spherical gel particles after shrinkage thereof is substantially complete but before the final removal of water therefrom.

In recent years, considerable interest has developed in the manufacture of inorganic oxide gels as spheres, primarily because of the advantages inherent in this type of physical form. A number of processes for making spherical gel particles have been described in the art, such as, for example, the method of Marisic set forth in U. S. Patent 2,384,946. Briefly, this method involves the preparation of a gelable inorganic oxide hydrosol characterized by a relatively short time of gelation. The hydrosol is admitted in the form of separate globules to a body of oil or other water-immiscible fluid in which the globules assume a spheroidal shape and set to a hydrogel. The spheroidal hydrogel particles so obtained may be washed, base-exchanged, heat treated or otherwise processed to obtain the desired physical and chemical characteristics in the final product. The form of the particles is generally maintained substantially constant from a time prior to gelation until after the gel has been dried. During drying, the hydrogel spheres shrink considerably, usually to about one-tenth of their original volume. The extent of drying will depend somewhat on the use which it is desired to make of the product but, in any event, the drying is carried to a stage beyond that at which maximum shrinkage of the gel is obtained. The gel particles, after syneresis or shrinkage thereof has been completed, are substantially dry; that is, the gel possesses open pores free of liquid although it still contains a relatively small percentage of strongly adsorbed water which is evolved during the final drying operation carried out at relatively high temperatures.

One of the difficulties encountered in the formation of spherical gel particles has been the large loss of particles due to shattering during the drying operation. This shattering apparently results from internal stresses which develop within the spherical particles as the liquid phase is removed. It has been observed in operation that practically all of the shattering and breakage of spherical gel particles takes place during the final drying stages after shrinkage of the gel is substantially complete. Thus, the first stage of drying the spherical gel particles involves the shrinkage phase accompanied by a considerable volume decrease. It has been noted that shattering or breakage of the gel particles during this stage is substantially nil and that in the subsequent drying stage during which the gel particles undergo virtually no further volume change, the usually encountered breakage occurs. It has accordingly been found desirable to interrupt the drying operation after shrinkage of the spherical gel particles is substantially complete but before final drying and to subject the shrunken particles to an intermediate processing procedure designed to reduce the extent of gel breakage. An effective procedure accomplishing this objective is described in copending application Serial No. 220,039, filed April 9, 1951.

The present invention is directed to a method for automatically selecting and removing gel particles from the drying operation after the shrinkage stage but before the final drying stage. The method broadly involves conducting hydrogel particles or initially wet, partially dried gel particles onto a screen of mesh size such that gel particles resulting upon substantially complete shrinkage of the hydrogel particles, or initially wet gel particles, pass through the screen, leaving particles which have not attained substantially complete shrinkage remaining on the screen. The screen is located in a drying atmosphere, the temperature of which is such that substantially complete shrinkage of the hydrogel particles on the screen is effected, thereby affording a separation between the gel particles which attain substantially complete shrinkage and pass through the screen and those particles remaining on the screen which have not attained substantially complete shrinkage. The particular mesh size of the screen is correlated with the diameter of the shrunken gel particles so that after virtual completion of syneresis, the gel particles pass through the screen. The shrunken particles which fall through the screen are then permitted to pass out of the drying zone by the action of gravity or by falling onto a conveyer which removes them.

The method of this invention is further adapted to continuous operation utilizing a process wherein a moving belt-like screen is employed. In this process, initially wet gel particles or hydrogel particles are conducted to one end of the moving screen and the rate of movement of the screen through a drying zone is such that at least a major portion of the hydrogel or initially wet gel particles on the screen atttain substantially complete shrinkage and pass through the screen before dropping from the end thereof. The gel particles which pass through the screen represent those particles which have attained substantially complete shrinkage. The particles which drop from the end of the moving screen represent those particles which have not attained substantially complete shrinkage.

It is further within the purview of this invention to separate initially wet gel particles or hydrogel particles having an appreciable distribution in size. In such instances, the wet gel or hydrogel charge is conducted through a multiple number of conveyer or static screens, maintained in a drying atmosphere, each screen being capable of receiving a pre-sieved size group of gel particles and having a mesh size appropriately adjusted to the final size of the particles after syneresis is substantially complete. The distribution of wet gel particles or hydrogel particles according to size groups may also be accomplished in accordance with the procedure of this invention by conveyer type screens of sizes appropriate to the initial size of the wet gel or hydrogel particles.

The invention may be further understood by reference to the attached drawings wherein:

Figure 1 is an elevational view of an apparatus useful in the present process employing a static screen.

Figure 2 is an elevational view partly in section illustrating suitable apparatus for accomplishing a continuous selective process employing principles of the invention.

Figure 3 is an elevational view partly in section illustrating an apparatus designed for a plurality of successive selector operations.

Referring particularly to Figure 1, initially wet gel or hydrogel particles are conducted from storage vessel 10 through conduits 11 provided with valves 12, into a drying chamber 13. Drying chamber 13 is provided with a screen 14 extending across the bottom thereof. The screen is of a mesh size such that passage therethrough of gel particles resulting upon substantially complete shrinkage of the initially wet gel particles or hydrogel particles is permitted. A drying gas is passed upwardly through the particles resting on screen 14 through a plurality of conduits 15. Exhaust gases are withdrawn from chamber 13 through a plurality of outlet conduits 16. The gel particles which have undergone substantially complete shrinkage pass through screen 14 and are conducted from the drying atmosphere through outlet conduit 17. This outlet conduit is provided with a gas seal, such gas being introduced through conduit 18. Generally, the gas introduced through conduit 18 will be the same as the drying gas introduced through conduits 15. Abnormal gel particles which do not undergo normal synthesis and do not drop through the screen may be periodically removed therefrom.

Turning now to Figure 2, initially wet gel particals or hydrogel particles are conducted by means of trough 19 onto an endless moving belt-like screen 20. This screen is contained within chamber 21. Drying gases are passed into chamber 21 through conduits 22 and exhaust gases are withdrawn therefrom through outlets 23. The temperature of the drying gases and the rate of movement of the screen are correlated in order that at least a major portion of the initially wet gel particles or hydrogel particles on the screen attain substantially complete shrinkage and pass through the screen before dropping from the end thereof. The particles which have undergone substantially complete shrinkage pass through the screen and fall into a funnel-like container 24. From said container the shrunken particles pass through conduit 25 and are thus removed from the drying zone. Conduit 25 is provided with a gas seal, said gas being introduced through a pipe 26. Ordinarily, the gas introduced through pipe 26 is the same as the drying gases introduced through conduits 22. The gel particles which do not experience normal syneresis while on the moving screen drop from the end thereof and fall into a chute 27, by which means they are removed from the drying zone. The above-described apparatus affords a continuous method for effecting separation between gel particles which have attained substantially complete shrinkage and those particles which have not undergone substantially complete shrinkage.

Turning now to Figure 3, hydrogel particles having an appreciable distribution in size are conducted by means of trough 28 onto an endless belt-like screen 29. The mesh size of the screen is such that gel particles attaining substantially complete shrinkage will pass therethrough. The rate of movement of the screen and the temperature at which the gel particles are maintained are correlated so that at least a major portion of the hydrogel particles on said screen pass therethrough while the remainder of the hydrogel particles which do not experience normal syneresis drop from the end of the screen and fall into chute 30. The gel particles passing through screen 29 fall into a funnel-like conduit 31 and are conducted onto a second endless moving screen 32 of somewhat finer mesh size than screen 29. The selector operation is then repeated. The shrunken gel particles passing through screen 32 fall into a second funnel-like conduit 33 and are conducted to a third moving screen 34 of still finer mesh size. The particles passing through screen 34 fall into a third funnel-like conduit 35 and pass therethrough and are removed from the drying atmosphere. The particles which do not pass through screen 32 fall from the end thereof into chute 36. Likewise, the particles which do not pass through screen 34 fall from the end thereof into chute 37. All of the rejected particles which have not undergone substantially complete shrinkage are combined in conduit 38 and are thereby removed from the apparatus. All of the aforementioned screens are contained within a chamber 39. Drying gases are passed through a plurality of conduits 40 and exhaust gases are withdrawn therefrom through a plurality of outlets 41. The sieved particles pass from the apparatus through outlet 42 which is provided with a gas seal, said gas being introduced through pipe 43. It will be understood that the number of endless moving screens employed will depend upon the extent of desired separation of the partially dried inorganic gel particles being processed. It is contemplated that any convenient number of endless moving screens may be employed in achieving the objects of the invention. Also, it will be understood that a plurality of static screens may be used in achieving the desired separation of the partially dried inorganic gel particles.

The following example will serve to illustrate the process of the invention without limiting the same:

Example

A silica-alumina hydrosol was prepared by mixing 1.00 volume of a solution of sodium silicate containing 157.0 grams of $SiO_2$ per liter with one volume of a solution containing 39.79 grams of aluminum sulfate and 30.51 grams of sulfuric acid per liter. The resulting colloidal solution was ejected from a nozzle in the form of globules into a column of gas oil, the depth of which was 8 feet. The globules of solution fell through the oil and gelled before passing into a layer of water located beneath the oil. The time of gelation for the concentrations and proportions of reactants given above was about 4 seconds. The spheroidal particles of gel were conducted out of the bottom of the column into a stream of water and on removal from the water were base-exchanged with an aqueous solution of aluminum sulfate and water-washed.

The spherical hydrogel particles so obtained are dried by conducting into a vessel such as that shown in Figure 1 employing a screen of .65 centimeter mesh size. The particles are dried by passing superheated steam or other drying gas through the hydrogel particles on the screen until substantially complete shrinkage of the hydrogel particles is attained. The gel particles after completion of such operation have an average diameter of about 12 millimeters and pass through the screen. Gel particles which have not attained substantially complete shrinkage remain on the surface of the screen, thus affording the desired separation.

It will be evident from the foregoing example that the procedure of this invention affords an effective means for selectively separating partially dry spherical gel particles. It will be understood that the procedure described herein is equally applicable to the separation of hydrogel particles of other geometrical shape having substantially uniform dimension. The process may further be used in instances wherein the hydrogel particles have an appreciable distribution in size, and in such cases apparatus similar to that shown in Figure 3 will be used. Those skilled in the art will also realize that the initial charge may either consist of hydrogel particles or initially wet gel particles which have undergone some drying but which have not been dried to an extent corresponding to substantially complete shrinkage of the gel particles.

It is to be understood that the above description is merely illustrative of preferred embodiments of the invention, of which many variations may be made within the scope of the following claims by those skilled in the art without departing from the spirit thereof.

I claim:

1. A method for effecting separation of partially dried particles of inorganic gel in regards to the extent of completion of syneresis thereof, which comprises conducting hydrogel particles of substantially uniform dimension onto a screen of mesh size such that gel particles resulting upon substantially complete shrinkage of said hydrogel particles pass through said screen leaving particles which have not attained substantially complete shrinkage remaining on said screen, forcing an upwardly moving stream of drying gas through said hydrogel particles until said substantially complete shrinkage thereof is effected, whereby separation is achieved between inorganic gel particles which have attained substantially complete shrinkage and passed through said screen and those particles remaining on said screen which have not attained substantially complete shrinkage.

2. A method for effecting separation of partially dried spherical particles of inorganic gel in regards to the extent of completion of syneresis thereof, which comprises conducting substantially uniform spherical hydrogel particles onto a screen of pre-determined mesh size capable of permitting passage therethrough of gel particles resulting upon substantially complete shrinkage of said hydrogel particles, agitating said hydrogel particles contained on said screen with an upwardly moving stream of drying gas until said substantially complete shrinkage is effected, whereby separation is achieved between those spherical inorganic gel particles which have attained substantially complete shrinkage and passed through said screen and those particles remaining on said screen which have not attained substantially complete shrinkage.

3. A continuous process for effecting separation of partially dried particles of inorganic gel in regards to the extent of completion of syneresis thereof, which comprises continuously conducting hydrogel particles of substantially uniform dimension onto a screen of mesh size such that gel particles resulting upon substantially complete shrinkage of said hydrogel particles pass through said screen, continuously moving said screen containing said particles through a drying zone, the rate of movement of said screen and the temperature of said drying zone being correlated in order that at least a major portion of said hydrogel particles attains substantially complete shrinkage and passes through said screen before dropping from the end thereof, collecting the gel particles which continuously pass through said moving screen, representing those particles which have attained substantially complete shrinkage and separately collecting the particles which fall from the end of said screen, representing those particles which have not attained substantially complete shrinkage.

4. A continuous method for effecting separation of partially dried spherical particles of inorganic gel in regards to the extent of completion of syneresis thereof, which comprises continuously conducting substantially uniform spherical hydrogel particles onto an endless belt-like screen of pre-determined mesh size capable of permitting passage therethrough of gel particles resulting upon substantially complete shrinkage of said hydrogel particles, continuously moving said screen containing said particles through a drying zone at a rate such that at least a major portion of said hydrogel particles attains substantially complete shrinkage and passes through said screen before dropping from the end thereof, continuously collecting the spherical gel particles which pass through said moving screen and continuously separately collecting those particles which drop by gravity from the end of said moving belt-like screen.

5. A continuous method for effecting separation of partially dried particles of inorganic gel in regards to the extent of completion of syneresis thereof, which comprises continuously conducting hydrogel particles onto a screen of mesh size such that gel particles resulting upon substantially complete shrinkage of said hydrogel particles pass through said screen, continuously moving said screen containing said particles through a drying zone at a rate such that hydrogel particles which attain substantially complete shrinkage readily pass therethrough while hydrogel particles which do not attain substantially complete shrinkage drop from the end thereof, selecting the gel particles which pass through said moving screen and conducting said particles onto subsequent moving screens of mesh size appreciably finer than said first screen, such selector operation being repeated a multiple number of times to attain separation of the shrunken hydrogel particles.

6. A method for effecting separation of partially dried particles of inorganic gel in regards to the extent of completion of syneresis thereof, which comprises conducting gel particles which have been partially dried onto a screen of mesh size such that gel particles resulting upon substantially complete shrinkage of said partially dried gel particles pass through said screen, leaving particles which have not attained substantially complete shrinkage remaining on said screen, forcing an upwardly moving stream of drying gas through said partially dried gel particles until said substantially complete shrinkage thereof is effected, whereby separation is achieved between inorganic gel particles which have attained substantially complete shrinkage and pass through said screen and those particles remaining on said screen which have not attained substantially complete shrinkage.

7. A continuous method for effecting separation of partially dried spherical particles of inorganic gel in regards to the extent of completion of syneresis thereof, which comprises continuously conducting substantially uniform spherical partially dried gel particles onto an endless belt-like screen of predetermined mesh size capable of permitting passage therethrough of gel particles resulting upon substantially complete shrinkage of said partially dried gel particles, continuously moving said screen containing said particles through a drying zone at a rate such that at least a major portion of said partially dried gel particles attains substantially complete shrinkage and passes through said screen before dropping from the end thereof, continuously collecting the gel particles which pass through said moving screen and continuously separately collecting those particles which drop from the end of said moving screen.

PAUL B. WEISZ.

No references cited.